United States Patent [19]

Stephenson et al.

[11] Patent Number: 5,183,698
[45] Date of Patent: Feb. 2, 1993

[54] ELECTRICAL OVERSTRESS PULSE PROTECTION

[75] Inventors: Roger C. Stephenson, Woodland Hills; Hugh M. Hyatt, Camarillo, both of Calif.

[73] Assignee: G & H Technology, Inc., Camarillo, Calif.

[21] Appl. No.: 666,026

[22] Filed: Mar. 7, 1991

[51] Int. Cl.⁵ ............................................. B32B 9/00
[52] U.S. Cl. .................................... 428/209; 428/901; 174/267; 174/250
[58] Field of Search ............... 357/23.13, 51; 174/267, 174/250; 428/901, 209

[56] References Cited

U.S. PATENT DOCUMENTS 4,097,834  6/1978  Mar et al. ............................ 338/21
4,726,991  2/1988  Hyatt et al. ......................... 428/329

FOREIGN PATENT DOCUMENTS 0981797  1/1976  Canada ................................ 174/264

Primary Examiner—Patrick J. Ryan
Assistant Examiner—Kam Lee
Attorney, Agent, or Firm—Boris Haskell

[57] ABSTRACT

An arrangement for protection of electrical equipment from electrical overstress pulses or transients using an electrical coupling to ground through a non-linear resistance having a high resistance at normal voltages and a very low resistance in response to an excessively high voltage pulse of transient, wherein the non-liner resistance is interposed between two contraposed faces of two electrodes, and at least one of said electrodes is a thin planar element whose said face is a thin edge of the planar element.

26 Claims, 3 Drawing Sheets

ELECTRICAL OVERSTRESS PULSE PROTECTION

SUMMARY OF THE INVENTION

The present invention relates to the protection of electrical and electronic circuits from high energy electrical overstress pulses that might be injurious or destructive to the circuits, and render them non-functional, either permanently or temporarily. Suitable non-linear compositions and composite formulations of materials are known which can be connected to, or incorporated as part of an electrical circuit, and are characterized by high electrical resistance when exposed to low or normal operating voltages, but essentially instantaneously switch to low electrical resistance in response to an excessive or overstress voltage pulse, thereby shunting the excessive voltage or overstress pulse to ground. The present invention relates particularly to structural arrangements for the inclusion of those non-linear materials into electrical circuits.

The materials utilized in practicing the present invention are designed to respond substantially instantaneously to the leading edge of an overstress voltage pulse to change their electrical characteristics, and by shunting the pulse to ground, to reduce the transmitted voltage of the pulse to a much lower value, and to clamp the voltage at that lower value for the duration of the pulse. These materials are also capable of substantially instantaneous recovery to their original high resistance value on termination of the overstress pulse, and of repeated responses to repetitive overstress pulses. For example, these materials can be designed to provide an ohmic resistance in the megohm range in the presence of low applied voltages in the range of 10 to more than 100 volts. However, upon the application of a sudden overstress pulse of, for example, 4,000 volts, these materials essentially instantaneously drop in resistance and switch to a low impedance shunt state that reduces the overstress pulse to a value in the range of a few hundred volts, or less, and clamps the voltage at that low value for the duration of the pulse. In the present description, the high resistance state is called the "off-state", and the low resistance condition under overstress is called the "on-state".

Overstress responsive compositions are known in the art, and in general, they constitute a mixture or composite of finely divided electrically conductive and semiconductive particles supported in fixed spaced relation to each other in an electrically insulative resin binder or matrix. The most effective composition or composite for use in the practice of the present invention is described in U.S. patent application Ser. No. 07/273,020, assigned to the assignee of the present invention, now U.S. Pat. No. 4,992,333. The entire teaching of said application is incorporated herein by reference. In general, said composite comprises a mixture of different micron sized particles of conductive and semiconductive materials with angstrom sized spacer particles, which are densely packed and bound with an insulative resin matrix. Other electrical overstress compositions are described and illustrated in other prior art patents.

U.S. Pat. No. 2,273,704 to R. O. Grisdale discloses a granular composite material having a non-linear voltage-current characteristic. This patent discloses a mixture of conductive and semiconductive granules that are coated with a thin insulative film (such as metal oxides), and are compressed and bonded together in a matrix to provide stable, intimate and permanent contact between the granules.

U.S. Pat. No. 4,097,834 to K. M. Mar et al. provides an electronic circuit protective device in the form of a thin film non-linear resistor, comprising conductive particles surrounded by a dielectric material, and coated onto a semiconductor substrate.

U.S. Pat. No. 2,796,505 to C. V. Bocciarelli discloses a non-linear precision voltage regulating element comprised of conductor particles having insulative oxide coatings thereon that are bound in a matrix. The particles are irregular in shape, and are point contiguous, i.e. the particles make point contact with each other.

U.S. Pat. No. 4,726,991 to Hyatt et al. discloses an electrical overstress protection material, comprised of a mixture of conductive and semiconductive particles, all of whose surfaces are coated with an insulative oxide film, and which are bound together in an insulative matrix, wherein the coated particles are in contact, preferably point contact, with each other.

Additional patents illustrative of the prior art in respect to this general type of non-linear resistor are U.S. Pat. No. 2,150,167 to Hutchins et al., 2,206,792 to Stalhana, and 3,864,658 to Pitha et al.

As illustrated in the foregoing prior art, the overstress responsive compositions are usually positioned as a bulk material between a pair of contraposed electrodes having large areas facing each other, and the compositions are confined or clamped between the electrode structures. Because the matrix binder usually and preferably is a resin, the compression force applied during assembly of the electrodes and the composition affects the electrical properties of the resultant unit, and in use, changes in compression due to structural expansion and contraction likewise affects the electrical properties. Thus, both the off-state resistance and on-state resistance of these devices can vary, as well as the value of the overstress voltage at which the devices will switch from off-state to on-state and the voltage at which the overstress pulse is clamped for its duration.

In accordance with the present invention, the aforesaid difficulties are mitigated and effectively eliminated, and in addition, certain performance improvements are obtained. The present invention utilizes an edge electrode for at least one of the electrodes, and in certain embodiments both may be edge electrodes. To this end, said at least one electrode is formed from or with a thin metal lamina, and the thin edge of the lamina is used as the face of the electrode. This thin edge is placed in spaced contraposed relation to the face of the second electrode, and the latter face may itself be a thin edge, or it may be a relatively large flat surface area, or it may be the curved face of a cylindrical electrode such as a connector pin. The non-linear resistance composite material is interposed between the two electrode faces and makes electrical contact therewith. In the preferred arrangement, the thickness of the thin edge electrode(s) is less than the spacing between the electrodes. Because of this geometry, the interposed composite material is not subjected to the compressive action of contraposed large area electrode surfaces. In addition, the edge effect of the electrode enhances the local electric field and causes the composite material to switch from its off-state to its on-state earlier in the presence of an overstress electrical pulse, than with a comparable device where the contraposed faces of the electrodes present large areas. Also, when in the off-state, the resistance of the interposed composite is greater than with a comparable structure where the contraposed faces of the electrodes present large areas.

The thin lamina electrode may be a printed circuit element or ground plane, which would place its thickness at about 0.2 to 35 mils; or it may be a self-sustaining metal foil, which would place its thickness in the range of about 1 to 50 mils; or it may be a thin metal sheet of 50 mils or greater, preferably, but not limited to, up to about a tenth of an inch.

A further feature of the invention resides in the use of thin layers or laminae of the non-linear electrical resistance composite material in conjunction with the thin electrodes. The thickness of the layer of composite is not particularly significant in the practice of the invention, but more a matter of convenience. A thickness of between about a few mils and perhaps a few hundred mils is convenient for most applications. The composite material may be coated, laminated or physically clamped to the surface of the electrode. This clamping action will have little effect, if any, on the electrical properties of the device, because the active portion of the electrode is the thin edge portion, and the composite material which is between the effective faces of the electrodes is not significantly affected.

Accordingly, it is one object of the present invention to provide a structural arrangement for the inclusion of an electrical overstress responsive composite or composition in an electrical circuit.

Another object of the present invention is to provide a structural arrangement for the inclusion of an electrical overstress responsive composite or composition in an electrical circuit, which enhances the electrical performance characteristics of the composite or composition.

Still another object of the present invention is to provide a structural arrangement for the inclusion of an electrical overstress responsive composite or composition in an electrical circuit, which is not subject to variations in electrical characteristics due to compressive forces of the structure.

Other objects and advantages of the present invention will become apparent to those skilled in the art from a consideration of the illustrative specific embodiments of the invention provided in the following detailed description, had in conjunction with the accompanying drawings, in which like reference characters refer to like or corresponding parts.

DETAILED DESCRIPTION

Figure 1:
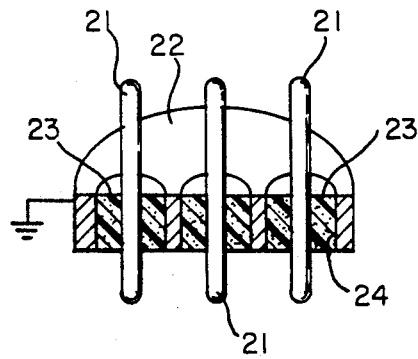
FIG. 1 is a cross-sectional and perspective view illustrative of the prior art.

Referring to FIG. 1 of the drawings, a prior art structure for the use of electrical overstress pulse protection composite is shown. For illustration purposes, the drawing can be considered to represent a section of a multipin connector. Three contact pins 21 are shown, and they are mounted in a conductive plate 22, which can be an electrical ground plane. The pins 21 are normally insulated from the ground plane as they pass through the plate 22, and in this instance, the insulation material or cylindrical plug 23 is formed of an electrical overstress pulse protection composite. Thus, normal electrical signals carried by the pins 21 are insulated from the ground plane 22. However, if a high voltage overstress pulse appears on a pin 21, the associated plug 23 responds by switching from its high resistance off-state to its low resistance on-state, to ground the pulse and thereby effectively to prevent the high voltage pulse from passing this point in the circuit. When the pulse has been dissipated, the plug 23 returns to its off-state and normal functioning of the circuit can resume.

A problem with this design, however, is, as explained above, that the clamp voltage and resistance of the overstress protection composite 23 is sensitive to compression particularly in the direction of current flow, i.e. between the pins 21 and the ground plane plate 22 across the plugs 23. Therefore, manufacturing of this device requires very close tolerances between the outside diameter of the pins 21 and the inside diameter of the holes 24 in the plate 22 within which the pins are located. In addition, these electrical properties will vary in response to thermal expansion and contraction of the structural components.

Figure 2:
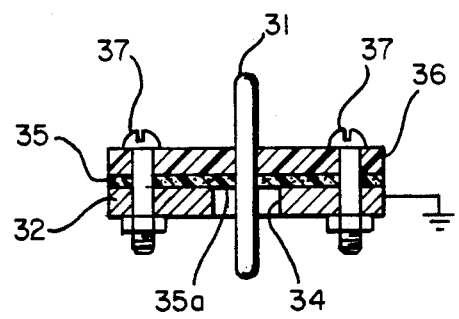
FIGS. 2 is a cross-sectional view of one embodiment of the invention.
Figure 3:
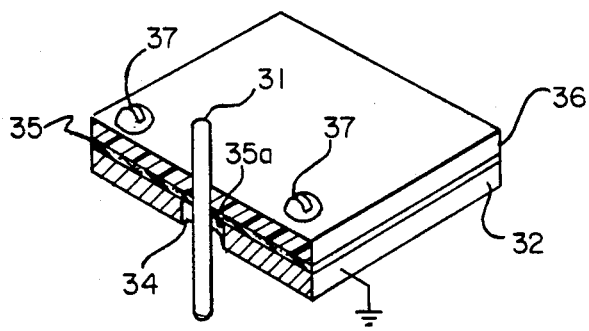
FIG. 3 is a cross-sectional and perspective illustration of the embodiment of FIG. 2.

These problems are essentially overcome or minimized, and other improvements are obtained in accordance with the teachings of the present invention. FIGS. 2 and 3 illustrate one form of the present invention that is functionally similar to the prior art device illustrated in FIG. 1. FIGS. 2 and 3 show a conductive ground plate 32 having a hole 34 to receive pin 31 therethrough. Hole 34 is larger than the diameter of pin 31 to isolate the pin from ground. Overlying a surface of the plate 32 is a thin, self-sustaining, planar layer 35 of the electrical overstress protection composite, and a stratum 36 of dielectric overlies the composite layer 35. Secure electrical contact between the ground plane 32 and composite protection layer 35 is obtained by screws 37 clamping layer 35 between the dielectric stratum 36 and the ground plate 32. Pin 31 passes through the protection layer 35 and the dielectric stratum 36, with the requirement that the pin 31 makes good electrical contact with the surrounding portion of layer 35. Because the clamping pressure on layer 35 is normal to its planar configuration, there is no clamping pressure on the portion 35a of layer 35 that connects the pin 31 to the ground plane 32. Therefore, the present structure does not suffer from the above-described disadvantages of the prior art, as illustrated by the structure in FIG. 1.

In this embodiment, the location of pin 31 is maintained by dielectric stratum 36, which provides the mechanical support for the pin. If otherwise appropriate, it is apparent that the hole 34 in the ground plate 32 could be filled with ordinary dielectric material to further help support and locate pin 31; and in that event, the hole for pin 31 in the dielectric stratum 36 would be enlarged to correspond to hole 34 in order to avoid clamping pressure on the protective layer 35 in the active region between the pin and the edge of the ground plate. It will also be appreciated that additional dielectric strata could be applied to the top and bottom of the assembly to further stabilize the position of pin 31. In that case, dielectric stratum 36 could also be relieved in the region around pin 31 in the same manner as hole 34.

In this embodiment, layer 35 may be a self-sustaining laminate or it could be a coating adhered to, and carried by the dielectric stratum 36.

Figure 4:
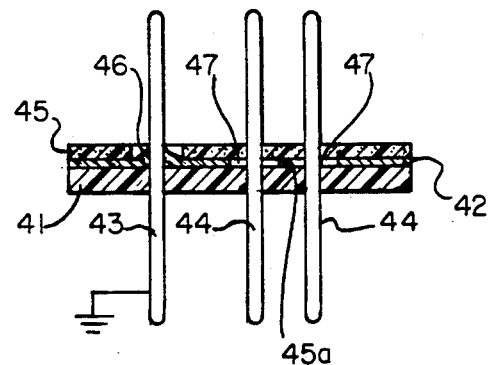
FIG. 4 is a cross-sectional view of a second embodiment of the invention.
Figure 5:
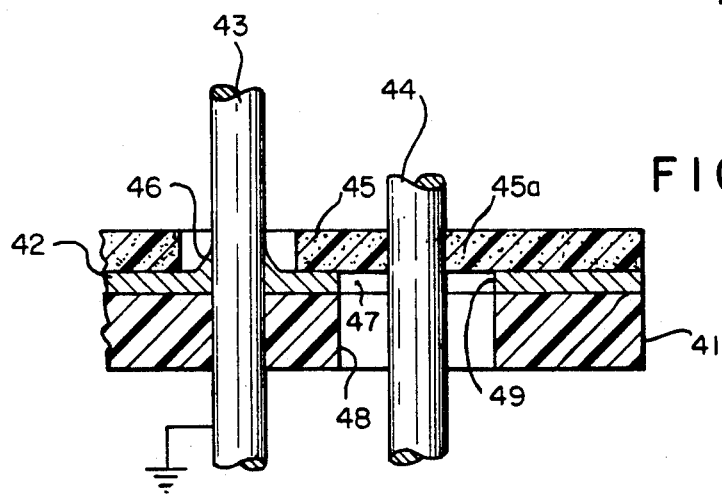
FIG. 5 is an enlarged detail of a modification of FIG. 4.

In its preferred form, the present invention is utilized with printed circuits or a printed ground plane, and that is illustrated in FIGS. 4 and 5. The conventional dielectric supporting substrate 41 carries a printed circuit 42 thereon, and the electrical overstress pulse protection thin planar layer 45 is coated over the printed circuit. The printed circuit may, of course, comprise a ground portion and an active circuit portion, or it may embody only a ground plane. The board 41 and protection layer 45 are appropriately drilled or otherwise formed to receive the pins 43, 44. Pin 43 is a ground pin and grounds the printed circuit 42, or a ground portion of the circuit, and that connection may be enhanced by soldering at 46. To facilitate this solder connection, a portion of the protection layer 45 is removed from around the pin 43.

In FIG. 4, the active or signal pins 44 are mounted and supported in the substrate 41, and pass through openings 47 in the printed circuit 42. These pins 44 pass through and engage the overstress protection layer 45 and make electrical contact therewith. Thus, pins 44 are normally isolated from ground; however, if an electrical high voltage overstress pulse appears on a pin 44, a portion 45a of the protection layer 45 that connects the pin with the ground plane will switch from the off-state to the on-state, and conduct that pulse to ground through the grounded printed circuit and pin 43.

In FIG. 5, the hole in substrate 41 around pin 44 has been enlarged or relieved at 48. This enlarged drawing clearly shows the advantageous geometry of the present invention. The very thin edge 49 of the grounded printed circuit provides an electrode surface facing or contraposed to pin 44, and the space between them is bridged by the surface of the thin layer of overstress protection composite 45. It is also shown that the space between edge 49 and pin 44 is greater than the thickness of the edge 49. In contrast to prior art large area facing electrodes as illustrated in FIG. 1, this geometry provides two improvements. First, the edge effect of electrode 49 enhances the field locally, and causes the protection composite 45 between edge 49 and pin 44 to switch from the off-state to the on-state earlier on the occurrence of an overstress voltage pulse. Second, because the effective area of the edge electrode 49 is so small and the bridging composite 45 is a thin planar structure, the off-state resistance is higher.

It is apparent that in the embodiments of FIGS. 4 and 5 it would be advantageous to use additional strata of dielectric on both the top surface of composite 45 and bottom surface of substrate 41 to stabilize the structure, particularly pins 43 and 44. It is likewise apparent that the active or signal pins 44 which are shown isolated from any printed circuit on substrate 41, could be connected to printed circuit portions that are isolated from the ground plane portion of the circuit.

Figure 6:
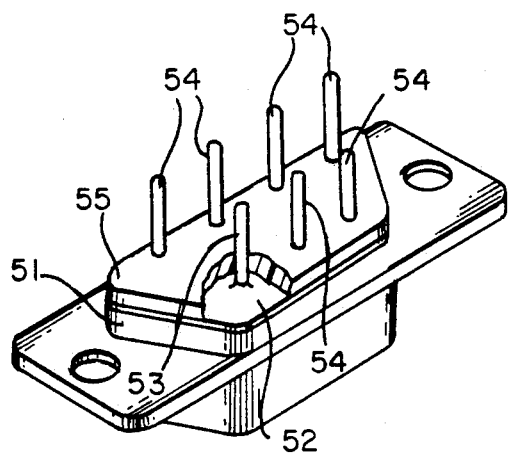
FIG. 6 illustrates the application of the invention to a D-subminiature connector.

The principles of the present invention are obviously applicable and adaptable to various circuit arrangements, connector designs, and circuit component configurations. Several illustrative devices are shown and described herein. FIG. 6 shows the pin and circit arrangement of FIG. 4 applied, for example, to a D-subminiature connector configuration. There, pin 53 is the ground pin, and the rest of the pins 54 are active circuit pins. The pins are mounted in a dielectric substrate 51, which carries a printed circuit ground plane 52 connected to ground pin 53, as shown in the cutaway section of the drawing. The active circuit pins 54 all pass through the ground plane without contact, like pins 44 in FIG. 4. However, the printed circuit ground plane is overlaid with the overstress protection composite layer 55, to provide the same protection as described above with reference to FIG. 4.

Figure 7:
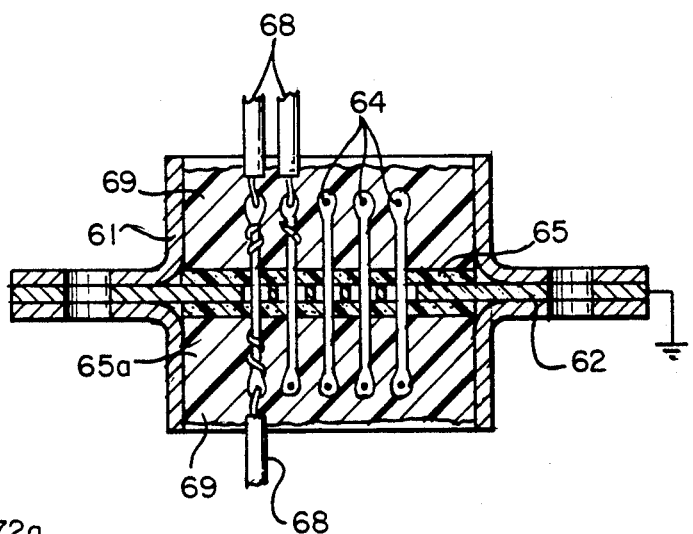
FIG. 7 shows another application of the invention.

FIG. 7 illustrates the application of the invention to a dedicated multilead overstress protection device, as distinguished from being incorporated in a connector or other component. In this instance, a housing 61 contains a thin foil conductive ground plane 62 that is sandwiched between two thin planar layers of electrical overstress protective composite 65 and 65a. A plurality of pins 64 pass through the layers of composite 65 and 65a and through the foil ground plane 62, with the foil being relieved around the pins so as to space the edges of the foil away from and out of contact with the pins, much the same as pins 44 in FIG. 4. Leads 68 are connected to the pins 64, and the housing or shell 61 can then be filled with a potting compound indicated by numeral 69. If an electrical overstress voltage pulse appears on any of the leads 68, the protection composite surrounding the corresponding pin 64 will change from the off-state to the on-state and shunt the pulse to ground, as in the preceding embodiments. As is apparent, one or more dielectric boards can be combined with the strata 65 and 65a and the foil 62 for support, as in the preceding embodiments.

Figure 8:
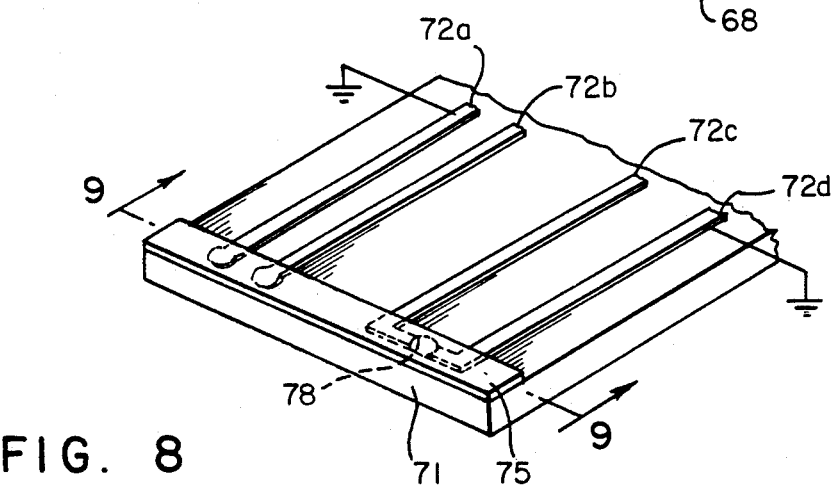
FIG. 8 show the application of the invention to a planar printed circuit.
Figure 9:
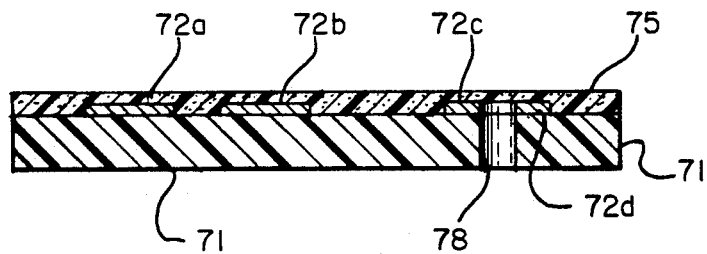
FIG. 9 is a cross-sectional view of FIG. 8 taken along the line 9—9.

In all of the foregoing embodiments, the invention is illustrated using a printed circuit or foil ground plane and active circuit components as pins passing through the ground plane. The invention may also be applied to planar printed circuits, and that is illustrated in FIGS. 8 and 9. The dielectric substrate 71 carries a planar printed circuit partially represented by the ground leads 72a and 72d, and the active circuit leads 72b and 72c. In an appropriate area, the leads, are covered by a planar overstress protection composite coating or laminate 75. In one form of the circuit, the leads 72a and 72b are printed so that their edges are closely spaced and facing each other in contraposed relation, in the area where they are are overcoated with the pulse protection layer. In the other illustrated form of the circuit, leads 72c and 72d were originally printed as connected by a conductive bridge, and then a hole 78 was drilled through the substrate 71 and the connecting circuit bridge before the pulse protection layer was applied. Again, the two leads 72c and 72d are provided with closely spaced, facing, contraposed edges. As in all the preceding embodiments, the presence of an overstress voltage pulse on one of the active circuit leads 72b or 72c causes the respective portion of the pulse protection composite 75 to change from the off-state to the on-state and shunt the high voltage pulse to the respective ground leads 72a and 72d.

Figure 10:
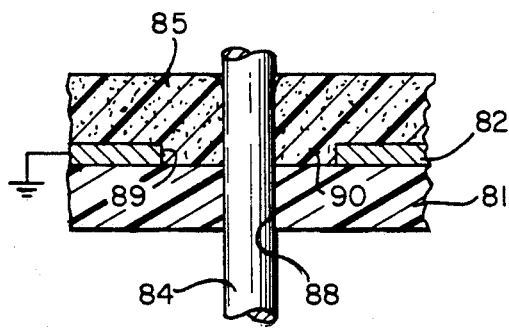
FIGS. 10–12 are enlarged, detailed fragmentary views of modifications of the structure shown in FIGS. 4 and 5.
Figure 11:
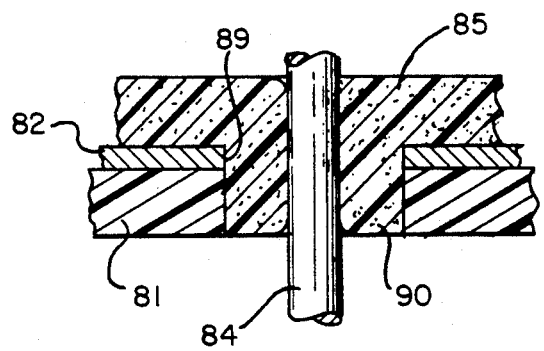
Figure 12:
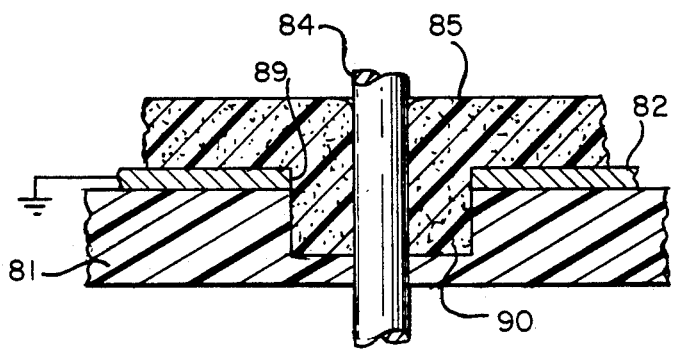

In each of the FIGS. 2-9, the layer of protective composite material is illustrated as bridging the space between the contraposed electrodes, as for example, in FIG. 5 the layer 45 bridges the space between pin 44 and the surrounding edge 49 of the printed ground plane 42. FIGS. 10-12 illustrate alternative arrangements wherein the protective composite material fills the space between the contraposed faces of the electrodes. In FIG. 10, the pin 84 is fitted in hole 88 in dielectric board 81. The printed ground plane 82 is applied to the surface of the board 81 with its edge 89 spaced from the pin 84, and the layer of protective composite material 85 is applied over the ground plane and engages the pin 84. In addition, the portion of the composite material shown at 90 fills the space between the electrode edge 89 and the pin 84. In FIG. 11, the dielectric board 81 is relieved from the pin 84 like the ground plane 82, and the portion 90 of the composite material 85 fills the space between the pin 84 and the edge electrode 89 as well as the relieved edge of the dielectric board. In FIG. 12, the arrangement is the same as in FIG. 11, except the dielectric board 81 is relieved from the pin 84 for only a portion of its depth. Obviously, for these arrangements, and particularly for FIGS. 11 and 12, additional dielectric boards can be applied over the top and/or bottom surfaces of the structures to grasp and stabilize the pins illustrated by pin 84.

Figure 13:
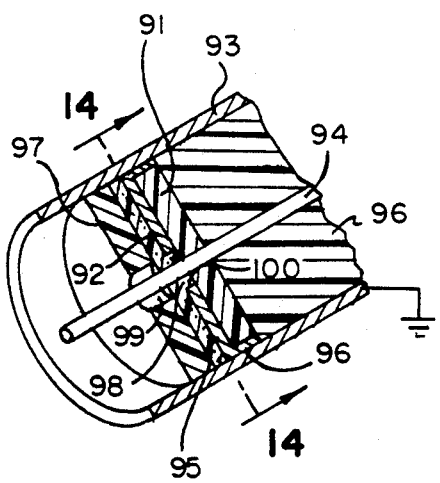
FIG. 13 is a cut away view illustrating the application of the invention to a coaxial line.

In FIG. 13, the invention is illustrated as applied to the coaxial cable environment. As shown, the invention is illustrated as an insert to the end of a coaxial cable to which a connector can be applied, if desired. As will be apparent to those skilled in the art, this same overstress pulse protection structure can readily be applied to a coaxial connector, per se. Referring to FIG. 13, the coaxial cable comprises the outer conductor or shield 93, normally grounded, and the center conductor or lead 94 maintained in spaced coaxial relation to the outer conductor 93 by the dielectric 96. The end of the cable has been cleared of dielectric for the insertion of the overstress pulse protection structure between the outer conductor or shield and the center conductor. This insertion comprises a disc-shaped dielectric substrate 91 having one surface coated or printed with the electrical conductive film 92. In this case, the conductive film is also coated over the outer edge of the substrate at 96 to make contact with the outer conductor 93, but obviously other expedients, such as spring contacts, could be used. The conductive film is relieved around the area penetrated by the center conductor, so as to be spaced therefrom. A layer of protective composite material 95 is applied over the conductive film and into the relieved area 98 between the edge of the conductive film 92 and the center conductor. For structural integrity a second dielectric disc 97 may be applied over the protective composite layer 95; and this disc is relieved at 99 around the area of the center conductor, so as not to apply or generate any compressive forces on the protective layer 95 in the region 98. As thus far described, it will be appreciated that this structure and its function are the same as shown and described with reference to FIGS. 5 and 10, except the device is placed in the coaxial cable environment instead of a planar or circuit board environment.

The conductive film 92 makes electrical contact with the grounded outer conductor 93 through its outer portion 96, and its edge 100 becomes a thin electrode contraposed to the center conductor 94. The pulse protection composite is interposed at 98 between, and makes electrical contact with the edge electrode 100 and the center conductor 94. Thus, under normal operating voltages, the center conductor 94 is essentially isolated from the outer conductor 93; but on the occurrence of an excessive or overstress pulse on the center conductor, the resistance of the protective composite in the region 98 drops to a very low value and shunts the overstress pulse to ground, i.e. to the outer conductor via the conductive film 92.

Figure 14A:
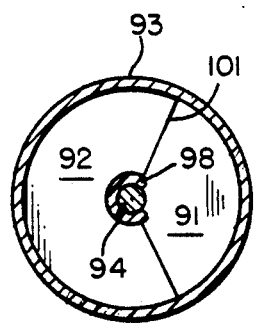
FIGS. 14A and 14B are cross-sectional views taken along line 14—14 of FIG. 13, showing two illustrative embodiments.
Figure 14B:
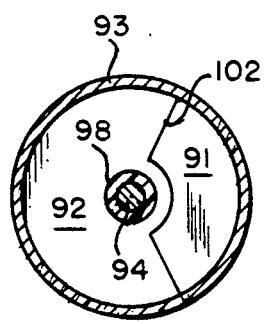

While the conductive film 92 may extend over the entire circumferential area of the substrate 91, preferably it would not, in order not to disrupt adversely the electrical characteristics of the coaxial cable. This feature is shown in the cross-sectional views of FIGS. 14A and 14B, showing the surface area of the conductive film 92. In FIG. 14A, a sector portion 101 of the conductive film 92 has been removed; and in FIG. 14B, a partial sector or segmental portion 102 has been removed. Obviously, the surface area of the film 92 can be any desired shape, so long as it provides the requisite current path from the protective composite at 98 to the outer conductor 93.

From the foregoing specific embodiments and description of the invention, it will be appreciated that an efficient structural arrangement is provided for the incorporation into electrical circuits and components of non-linear electrical overstress pulse protection composites. The structure comprises a thin essentially planar stratum of the composite, having two electrodes positioned in spaced relation to each other along the general plane of the stratum, and wherein at least one electrode provides a thin edge facing the second electrode. The thin edge electrode provides an enhanced local field, causing the composite to change from the off-state to the on-state more quickly on the occurrence of an overstress pulse; and it provides a small effective electrode area, causing the composite to provide a higher off-state electrical resistance, than in the prior art arrangements. This arrangement also avoids placing the active portion of the overstress protection composite under compression, thus stabilizing its electrical properties. Other embodiments of the invention, and modifications of the described embodiments will be apparent to those skilled in the art. Likewise, the use of various known techniques and expedients will be apparent, such as the use of plated through holes on circuit boards and spring clips to mount the pins and make electrical contact on the circuit board and dilectric strata. It is understood that such embodiments, modifications and expedients as are embraced by the spirit and scope of the appended claims, are contemplated as being within the purview of the present invention.

What is claimed is:

1. A device for protecting against high voltage electrical overstress pulses or transients, comprising a pair of electrodes having faces positioned in spaced contraposed relation to each other, wherein at least one of said electrodes includes a thin lamina of metal and said face thereof is a thin edge of the lamina, and a non-linear electrical resistance composite material, comprising semiconductive particles bound in an insulation matrix, interposed between and making electrical contact with both said contraposed faces, said composite material exhibiting a high resistance to current flow when a low voltage is applied between said electrodes and a low resistance to current flow when a high voltage is applied between said electrodes.

2. A device as set forth in claim 1, wherein one of said electrodes is grounded and the other is not.

3. A device as set forth in claim 1, wherein said one electrode is a metal plate.

4. A device as set forth in claim 1, wherein said one electrode is a metal foil.

5. A device as set forth in claim 1, wherein said one electrode is a printed circuit supported by a dielectric substrate.

6. A device as set forth in claim 5, wherein both electrodes are supported by said substrate.

7. A device as set forth in claim 6, wherein said composite material is also supported by said substrate.

8. A device as set forth in claim 7, wherein said composite material is a thin substantially planar layer overlying said one electrode.

9. A device as set forth in claim 8, wherein said composite material is a coating.

10. A device as set forth in claim 8, wherein said composite material is a laminate.

11. A device as set forth in claim 7, wherein the other electrode is also a printed circuit supported by said substrate, and said composite material is a thin substantially planar layer overlying both said electrodes.

12. A device as set forth in claim 1, wherein said composite material is a thin substantially planar layer.

13. A device as set forth in claim 12, wherein said composite material overlies said one electrode.

14. A device as set forth in claim 13, and further including means to clamp together said one electrode and the overlying portion of said composite material.

15. A device as set forth in claim 1, wherein the other of said electrodes is a contact pin.

16. A device as set forth in claim 8, wherein the other of said electrodes is a contact pin extending transversely through said substrate and said layer of composite material.

17. A device as set forth in claim 16, and further including additional contact pin electrodes extending transversely through said substrate and said layer of composite material, each making electrical contact with said layer of composite material, and each having a face in spaced contraposed relation to said face of said one of said electrodes.

18. A device as set forth in claim 1, wherein the thickness of said thin edge is less than the spacing between the contraposed faces of the electrodes.

19. A connector comprising a dielectric substrate, a thin conductive ground plane layer overlying said substrate, a non-linear resistance composite material layer overlying said ground plane, a plurality of contact pins extending through said substrate, ground plane layer and composite material layer, said ground plane layer being relieved around each of said pins to provide thin edges of the ground plane layer facing and spaced from said pins, said composite material layer making electrical contact with each of said pins and said ground plain layer adjacent each of said thin edges, and means for coupling said ground plane layer to ground, said composite material exhibiting a high resistance to current flow when a low voltage is applied between a said pin and said ground plane layer, and a low resistance to current flow when a high voltage is applied between a said pin and said ground plane layer.

20. A connector as set forth in claim 19, wherein said coupling means is a contact pin extending through said substrate, ground plane layer and composite material layer and making electrical contact with said ground plane layer.

21. A transient electrical overstress protection device, comprising a thin conductive ground plane plate, a non-linear electrical resistance composite material overlying said plate, a plurality of pins extending through said plate and said composite material, said ground plane plate being relieved around each of said pins to provide thin edges of the ground plane plate facing and spaced from each of said pins, said composite material making electrical contact with each of said pins and said ground plane layer adjacent each of said thin edges, and a housing means therefor, said composite material exhibiting a high resistance to current flow when a low voltage is applied between a said pin and said ground plane layer, and a low resistance to current flow when a high voltage is applied between a said pin and said ground plane layer.

22. A device for protecting against high voltage electrical overstress pulses or transients, comprising a substantially cylindrical outer conductive element, a conductive lead arranged substantially coaxial with said outer element, a thin conductive element lying in a plane transverse to the axis of said cylindrical conductive element and said conductive lead and having a thin edge spaced from, and contraposed to said conductive lead, means effecting electrical contact between said thin conductive element and said cylindrical conductive element, and a non-linear electrical resistance composite material interposed between, and making electrical contact with said thin edge and said conductive lead, said composite material comprising semiconductive particles bound in an insulation matrix and exhibiting a high resistance to current flow when a low voltage is applied between said lead and said thin edge, and a low resistance to current flow when a high voltage is applied between said lead and said thin edge.

23. A device as set forth in claim 22, wherein said thin conductive element is a metal plate.

24. A device as set forth in claim 22, wherein said thin conductive element is a metal foil.

25. A device as set forth in claim 22, wherein said thin conductive element is a printed circuit element supported by a dielectric substrate.

26. A device as set forth in claim 22, wherein said thin conductive element and said composite material are supported by a dielectric substrate.

* * * * *